United States Patent
Knauer et al.

(10) Patent No.: US 10,630,121 B1
(45) Date of Patent: Apr. 21, 2020

(54) RIGID ROTOR STRUCTURES FOR CONICAL AIR GAP ELECTRODYNAMIC MACHINES

(71) Applicant: Regal Beloit America, Inc., Beloit, WI (US)

(72) Inventors: Paul Knauer, San Jose, CA (US); Alan Crapo, San Jose, CA (US)

(73) Assignee: REGAL BELOIT AMERICA, INC., Beloit, WI (US)

(*) Notice: Subject to any disclaimer, the term of this patent is extended or adjusted under 35 U.S.C. 154(b) by 387 days.

(21) Appl. No.: 14/863,377

(22) Filed: Sep. 23, 2015

(51) Int. Cl.
*H02K 1/27* (2006.01)
*H02K 1/28* (2006.01)
*H02K 21/02* (2006.01)

(52) U.S. Cl.
CPC ............ *H02K 1/27* (2013.01); *H02K 21/027* (2013.01); *H02K 1/278* (2013.01); *H02K 1/28* (2013.01)

(58) Field of Classification Search
CPC ........ H02K 21/027; H02K 1/27; H02K 1/278; H02K 15/03; H02K 1/28
USPC ............ 310/156.38, 156.59, 156.29, 156.26, 310/156.22, 156.23, 156.28, 310/156.07–156.15
See application file for complete search history.

(56) References Cited

U.S. PATENT DOCUMENTS

| | | | |
|---|---|---|---|
| 4,734,606 A * | 3/1988 | Hajec | F16C 33/1035 277/410 |
| 6,455,975 B1 * | 9/2002 | Raad | H02K 7/125 310/152 |
| 8,330,316 B2 | 12/2012 | Petro et al. | |
| 8,330,317 B2 | 12/2012 | Burch et al. | |
| 2005/0067917 A1 * | 3/2005 | Kastinger | F04D 25/166 310/257 |

(Continued)

FOREIGN PATENT DOCUMENTS

| CN | 1561569 A | 1/2005 |
|---|---|---|
| CN | 101438486 A | 5/2009 |

(Continued)

OTHER PUBLICATIONS

CN 104795955 A (English Translation).*
Chinese language Office Action, dated Jun. 28, 2019, for related CN patent application 201680068221.X.

*Primary Examiner* — Jermele M Hollington
*Assistant Examiner* — Alexander Moraza
(74) *Attorney, Agent, or Firm* — Armstrong Teasdale LLP (57) ABSTRACT

A rotor structure for a conical air gap electrodynamic machine has one or more rotor assemblies arranged on an axis of rotation. Each of the one or more rotor assemblies includes magnetically permeable structures positioned radially about the axis of rotation. The magnetically permeable structures include first surfaces confronting the conical air gap that are oriented at an angle to the axis of rotation and second adjacent surfaces that are at an angle to the axis of rotation. The second adjacent surfaces are disposed radially closer to the axis of rotation than the first surfaces. One or more groups of magnetic structures include magnetic material. The one or more groups of magnetic structures include a first group of magnetic structures interleaved with the magnetically permeable structures, a second group of magnetic structures, and a flux conductor shield disposed adjacent to the second group of magnetic structures.

15 Claims, 7 Drawing Sheets

(56) References Cited

U.S. PATENT DOCUMENTS

| | | | | |
|---|---|---|---|---|
| 2008/0278022 A1* | 11/2008 | Burch | ...................... | H02K 1/27 |
| | | | | 310/156.38 |
| 2012/0181880 A1* | 7/2012 | Zhao | ................... | H02K 1/2773 |
| | | | | 310/43 |
| 2012/0228979 A1* | 9/2012 | Petro | ........................ | H02K 1/14 |
| | | | | 310/156.38 |
| 2014/0054998 A1* | 2/2014 | Kim | ........................ | H02K 1/27 |
| | | | | 310/156.07 |
| 2014/0197703 A1 | 7/2014 | Chamberlin | | |
| 2014/0368074 A1* | 12/2014 | Tangudi | ................... | H02K 1/27 |
| | | | | 310/156.38 |

FOREIGN PATENT DOCUMENTS

| | | | | |
|---|---|---|---|---|
| CN | 102396138 A | | 3/2012 | |
| CN | 104795955 A | * | 7/2015 | ............ H02K 21/12 |
| JP | 2003184758 A | * | 7/2003 | |

\* cited by examiner

RIGID ROTOR STRUCTURES FOR CONICAL AIR GAP ELECTRODYNAMIC MACHINES

FIELD OF THE INVENTION

This invention relates generally to electrodynamic machines. More particularly, this invention relates to rigid rotor structures for conical air gap electrodynamic machines.

BACKGROUND OF THE INVENTION

Conical air gap motors are known to exhibit power efficiencies above the motor industry average in both low and high output power environments. U.S. Pat. Nos. 8,330,316 and 8,330,317 disclose such structures. Those patents, which are commonly owned by the applicant of this filing, are incorporated herein by reference.

The design of the rotor for such motors currently relies on component magnets to support and position the magnetically permeable poles that face the air gap. As such, the mechanical strength of those magnets is an important design consideration. As power demands on motors increase, so do the forces imparted on the component magnets.

Accordingly, there is a need for support structures for magnetically permeable poles that mitigate operational forces on component magnets.

SUMMARY OF THE INVENTION

A rotor structure for a conical air gap electrodynamic machine has one or more rotor assemblies arranged on an axis of rotation. Each of the one or more rotor assemblies includes magnetically permeable structures positioned radially about the axis of rotation. The magnetically permeable structures include first surfaces confronting the conical air gap that are oriented at an angle to the axis of rotation and second adjacent surfaces that are at an angle to the axis of rotation. The second adjacent surfaces are disposed radially closer to the axis of rotation than the first surfaces. One or more groups of magnetic structures include magnetic material. The one or more groups of magnetic structures include a first group of magnetic structures interleaved with the magnetically permeable structures, a second group of magnetic structures, and a flux conductor shield disposed adjacent to the second group of magnetic structures. The flux conductor shield is configured to provide return flux paths for the second group of the magnetic structures. A hub structure is positioned axially on the axis of rotation which has mating surfaces which are adjacent to and coextensive with the second adjacent surfaces of the magnetically permeable structures. A magnetically permeable plate is disposed in a plane that is perpendicular to the axis of rotation, at least a portion of which is configured as a disk.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The following definitions apply to some of the elements described with respect to some embodiments. These definitions may likewise be expanded upon herein.

As used herein, the term "air gap" refers, in at least one embodiment, to a space, or a gap, between a magnet surface and a confronting pole face. Examples of a magnet surface include any surface of magnetic material (e.g., a surface of a permanent magnet), a surface of an internal permanent magnet ("IPM"), such as a magnetically permeable material through which flux passes (e.g., the flux being produced by a magnetic material), or any surface or surface portion of a "body that produces a magnetic field." Such a space can be physically described as a volume bounded at least by the areas of the magnet surface and the pole face. An air gap functions to enable relative motion between a rotor and a stator, and to define a flux interaction region. Although an air gap is typically filled with air, it need not be so limiting.

As used herein, the term "ferromagnetic material" refers, in at least one embodiment, to a material that generally exhibits hysteresis phenomena and whose permeability is dependent on the magnetizing force. The term "ferromagnetic material" can also refer to a magnetically permeable material whose relative permeability is greater than unity and depends upon the magnetizing force.

As used herein, the term "generator" generally refers, in at least one embodiment, to an electrodynamic machine that is configured to convert mechanical energy into electrical energy regardless of, for example, its output voltage waveform. As an "alternator" can be defined similarly, the term generator includes alternators in its definition.

As used herein, the term "hub" refers, in at least one embodiment, to a generally polygon shape, the axis of which is aligned with an axis of rotation. In particular a hub has mating surfaces at its exterior which cooperate with surfaces of components that are disposed exterior to the hub to provide mechanical support to such components. The mating surfaces are generally uniformly spaced circumferentially.

As used herein, the term "magnet" refers, in at least one embodiment, to a body that produces an external magnetic field. As such, the term magnet includes permanent magnets, electromagnets, and the like. The term magnet can also refer to internal permanent magnets ("IPMs"), surface mounted permanent magnets ("SPMs"), and the like.

As used herein, the term "motor" generally refers, in at least one embodiment, to an electrodynamic machine that is configured to convert electrical energy into mechanical energy.

As used herein, the term "magnetically permeable" is a descriptive term that generally refers, in at least one embodiment, to those materials having a magnetically definable relationship between flux density ("B") and applied magnetic field ("H"). Further, the term "magnetically permeable" is intended to be a broad term that includes, without limitation, ferromagnetic materials such as common lamination steels, cold-rolled-grain-oriented (CRGO) steels, powder metals, soft magnetic composites ("SMCs"), and the like.

As used herein, the term "soft magnetic composites" ("SMCs") refers, in at least one embodiment, to those materials that are comprised, in part, of insulated magnetic particles, such as insulation-coated ferrous powder metal materials that can be molded to form an element of the rotor structure.

Figure 1:
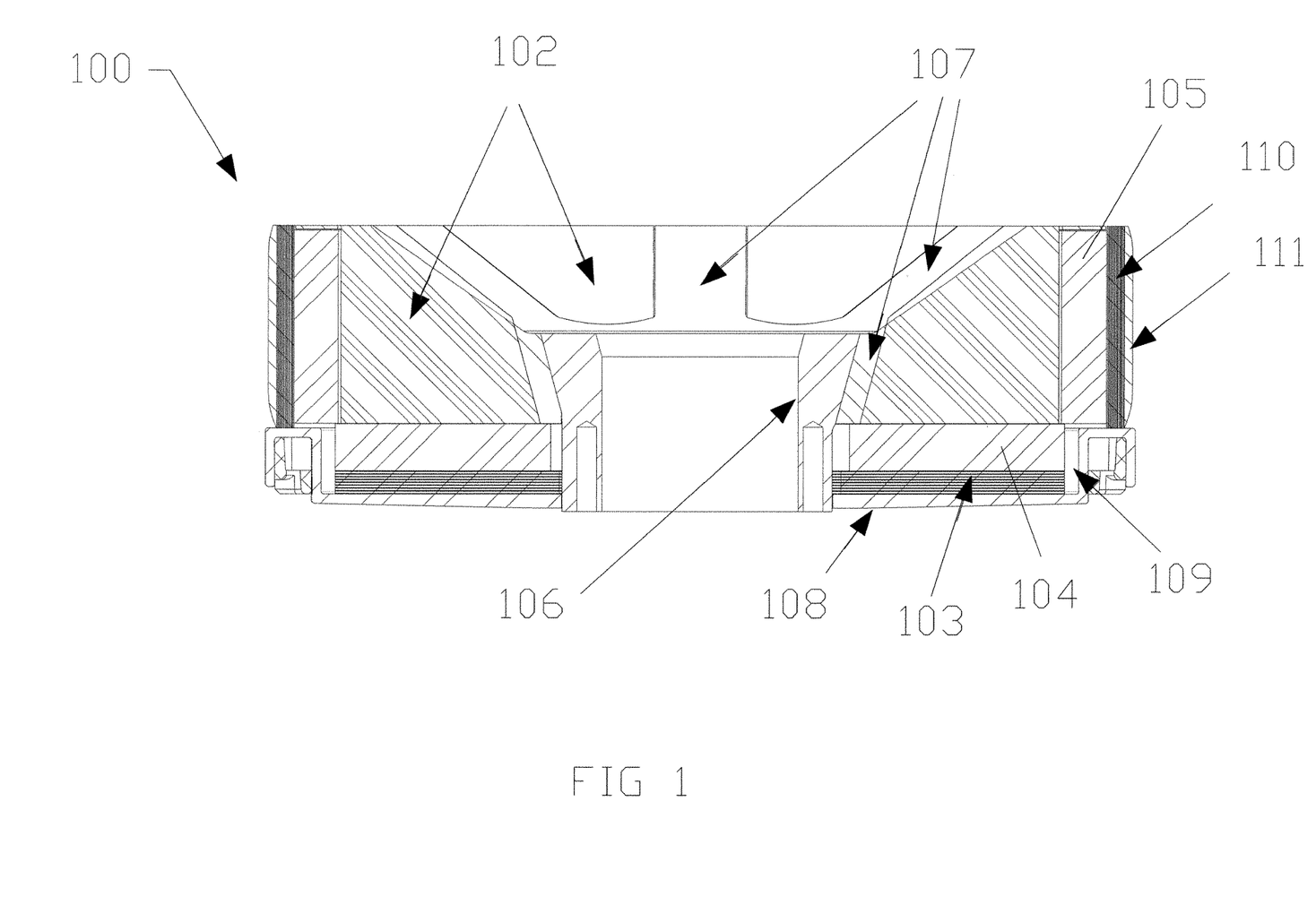
FIG. 1 is a cross-sectional view of a rotor structure including rotor assemblies configured in accordance with an embodiment of the invention.

FIG. 1 is a cross-sectional view of a rotor structure 100 including rotor assemblies in accordance with some embodiments. Various embodiments relate generally to electrodynamic machines and the like, and more particularly, to rotor assemblies and rotor structures for electrodynamic machines, including, but not limited to, outer rotor assemblies and/or inner rotor assemblies. In some embodiments, a rotor for an electrodynamic machine includes a rotor assembly.

Referring to FIG. 1, rotor assembly 100 has magnetically permeable structure 102 that constitutes a magnetic pole. A hub 106 (also shown in FIGS. 3A, 3B, and 5) engages an inner ring 107 (also shown in FIGS. 4A, 4B and 5). The rotor assembly also has an arrangement of magnetic structures 104 and 105.

FIG. 1 also illustrates flux conductor shields 103 and 110 with respective outer elements 108 and 111. FIG. 1 also illustrates a non-magnetic spacer 109.

Figure 2:
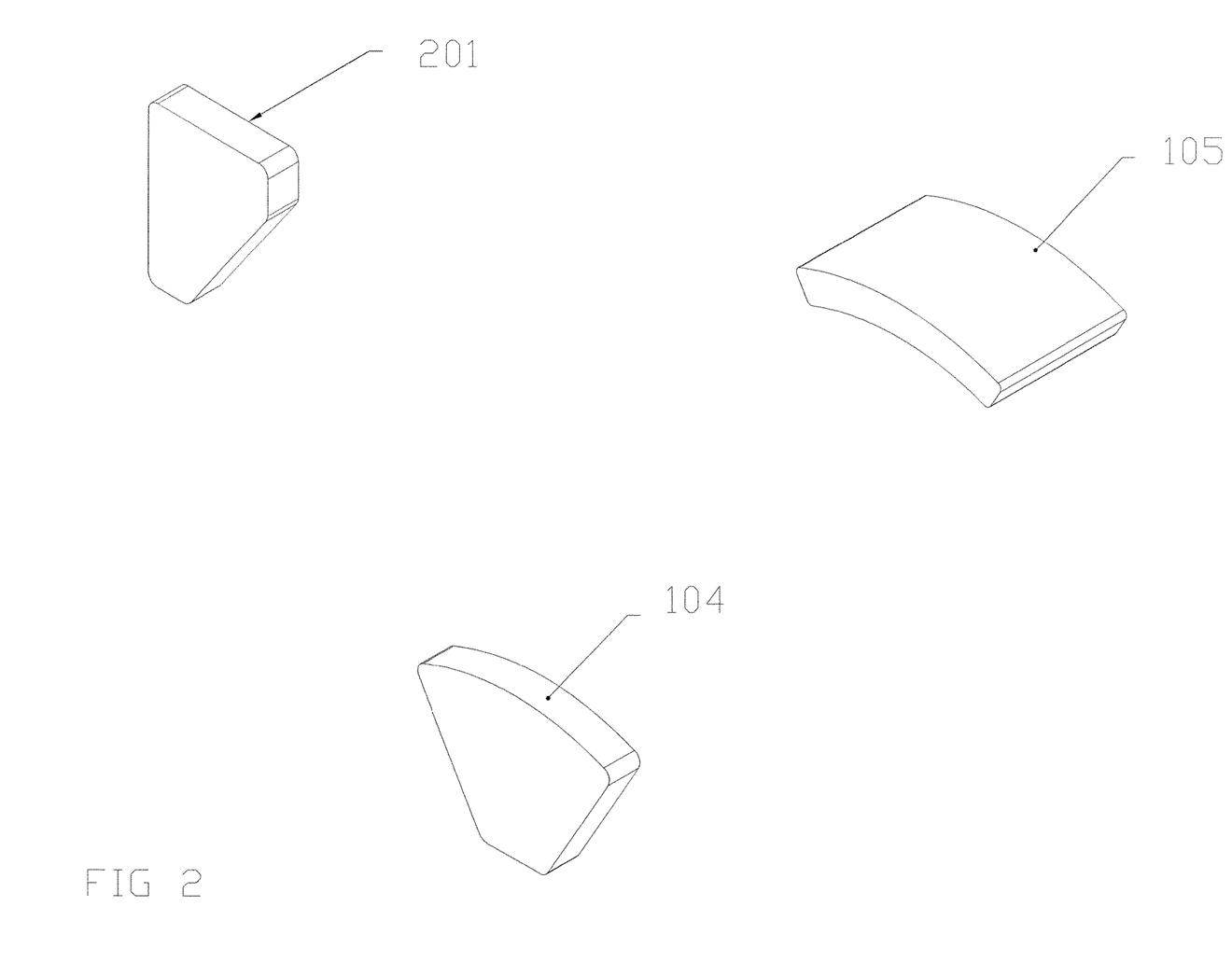
FIG. 2 depicts magnetic structures associated with a rotor assembly.
Figure 3A:
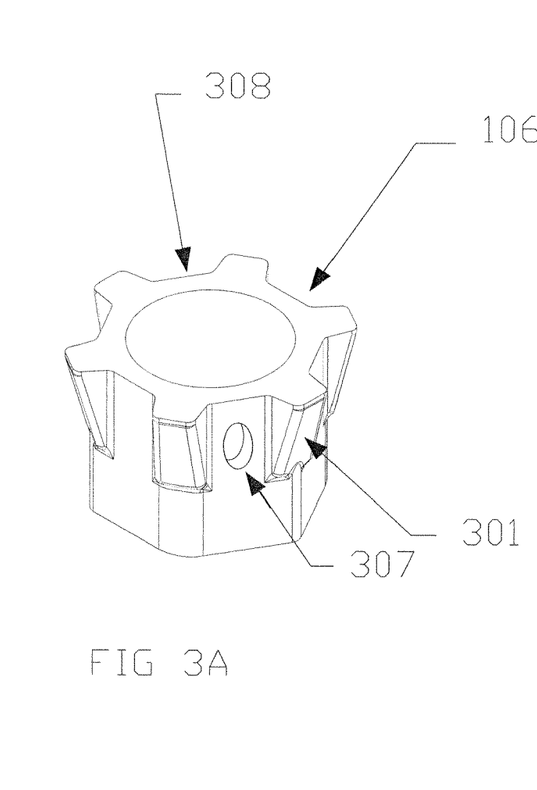
FIGS. 3A-3C illustrate hub components configured in accordance with an embodiment of the invention.
Figure 3B:
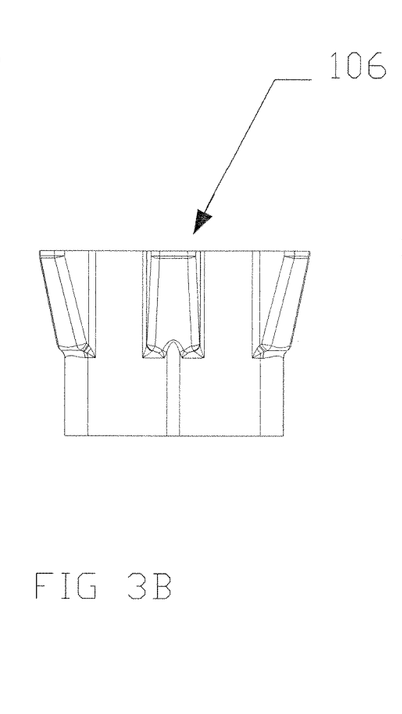
Figure 3C:
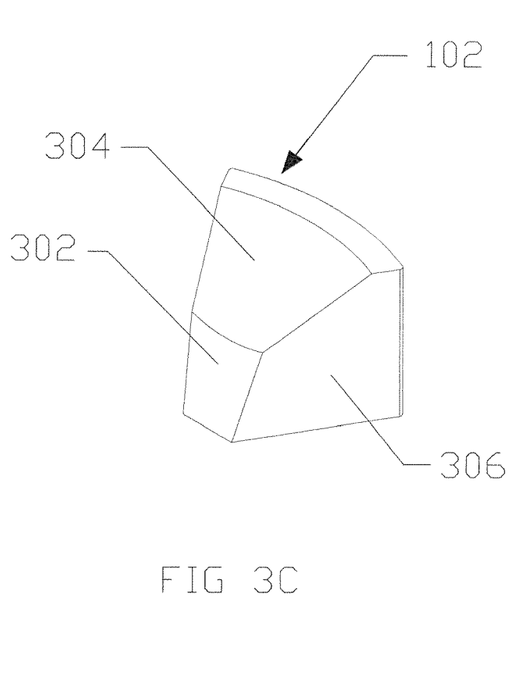

FIG. 2 illustrates an arrangement of magnetic structures 104, 105 and 201. FIG. 3A is a perspective view of the hub 106. The hub 106 has a hub surface 301. FIG. 3B is a side view of the hub 106. FIG. 3C illustrates a magnetically permeable structure 102 with a surface 302. The surface 302 (or a portion thereof) is coextensive (or is substantially coextensive) to one or more angles with respect to the axis of rotation. In the example shown, one or more magnetically permeable structures 102 of rotor assembly 100 can be disposed externally to a portion of a conically-shaped space (e.g., a conically-shaped space associated with conically-shaped air gaps that are centered on the axis of rotation).

FIG. 3C also illustrates a first surface 304 confronting the conical air gap. The first surface 304 is oriented at an angle to the axis of rotation. Surface 302 is a second adjacent surface is also at an angle to the axis of rotation. The second adjacent surface is disposed radially closer to the axis of rotation relative to the first surface 304. FIG. 3C also illustrates a non-confronting surface 306; that is, a surface that does not confront the conical air gap.

Observe that the hub surface 301 of FIG. 3A is adjacent to and coextensive with the second adjacent surface 302 of the magnetically permeable structure 102 of FIG. 3C. The hub surface 301 and the second adjacent surface 302 are each planar. In some embodiments, the hub surface 301 and the second adjacent surface 302 are curved as, for example, radii relative to the axis of rotation. The first surface 304 is concave to conform to the shape of the conical air gap. Regions between hub surfaces 301 define gaps 308. Thermoset or thermoplastic may be introduced into gaps 308 to provide strength and stability.

FIG. 3A also illustrates optional tubular channels (holes) 307 extending from the inside surface to the outside surface of the hub 106. During manufacturing, such channels allow thermoset or thermoplastic materials to be injected into void regions of the rotor structure 100 from the volume inside the hub 106.

Prior to this invention, the arrangement of magnetically permeable structures 102 could be mounted on, affixed to, or otherwise constrained by support structures, such as magnetic structures 104 and 105 which is turn were supported by shield structures 103 or 110. Shield structures 103 and 110 were supported by outer elements 108 and 111. In such prior embodiments, shield structures 103 and 110 were configured to support magnetically permeable structures 102 in compression against a radial force generated by the rotation of rotor assembly 100 around the axis of rotation. Such compressive forces also act on magnetic structures 105.

Figure 4A:
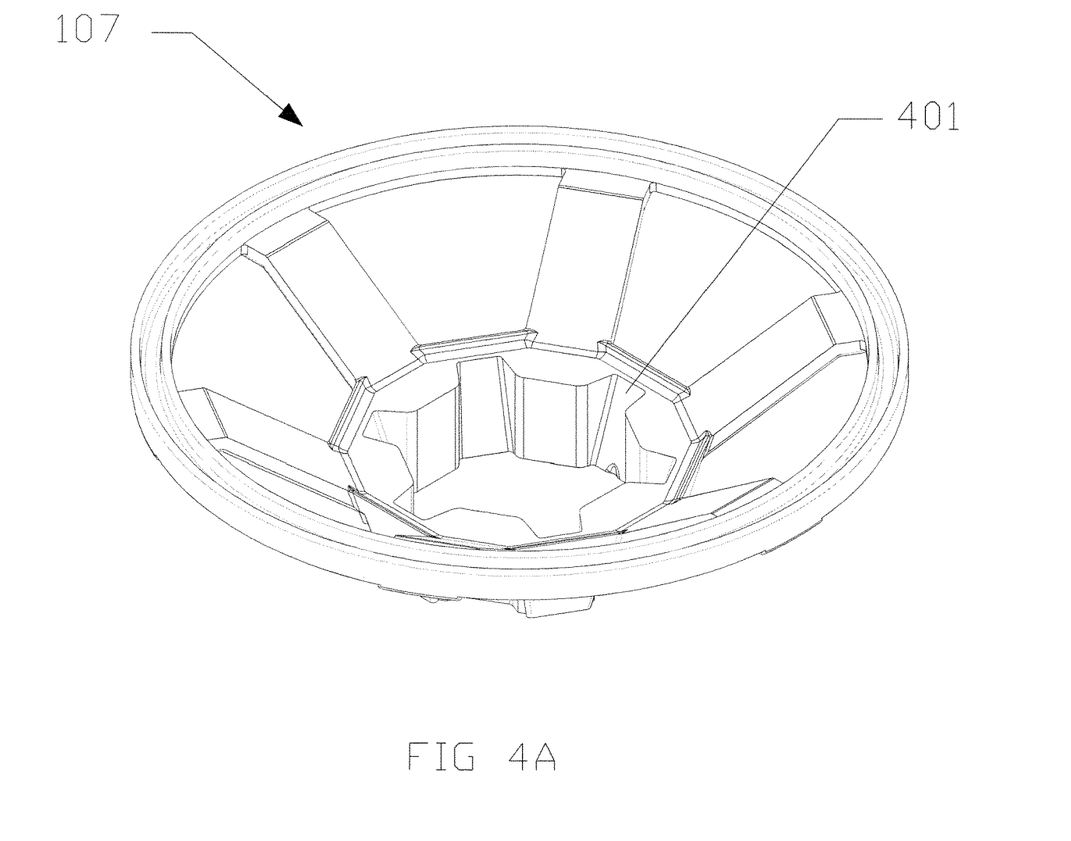
FIGS. 4A-4B illustrate an inner ring configured in accordance with an embodiment of the invention.
Figure 4B:
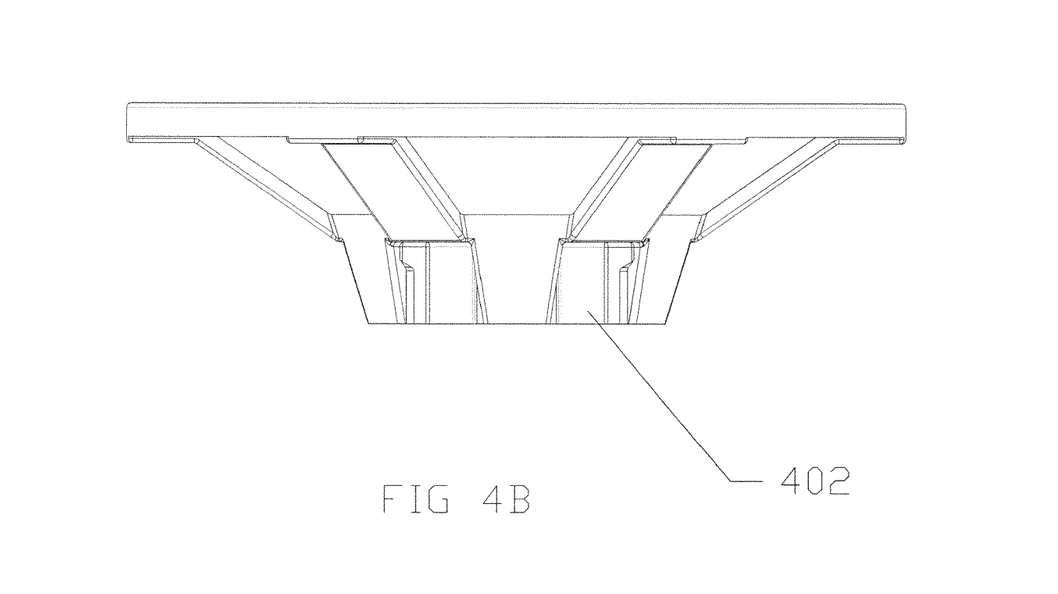

An inner ring 107 is depicted in FIG. 1 and FIG. 4. The invention relieves some of the forces on magnet 104 and shield 103. The inner ring 107 is positioned between the hub 106 and the magnetically permeable structures 102. The inner ring 107 is also disposed, at the air gap, between the magnetically permeable structures.

Referring to FIG. 1, the mechanical axial position of the magnetically permeable structures 102 relative to the outer element 108 (also referred to as back plate 108) may be controlled by wedge action between the hub 106 and the inner ring 107, and therefore between the inner ring 107 and the magnetically permeable structures 102.

The hub surface 301 of FIG. 3A may act compressively on a portion of inner ring surface 401 of FIG. 4A, which in turn through obverse inner ring surface 402 of FIG. 4B may act compressively on the surface 302 of magnetically permeable structure 102 of FIG. 3C. In this way an axial displacement of the hub 106, results in an axial force and a radial force on magnetically permeable structures 102 through the inner ring 107. Such forces can therefore lock the magnetically permeable structures 102 into a desired axial and radial position relative to the back plate 108. The inner ring 107 also serves to seal from the air gap those regions where magnetic structures are disposed.

In at least some cases, flux conductor shields 103 and 110 provide paths for flux. For example, flux conductor shields 103 and 110 can include magnetically permeable material to complete flux paths between poles (e.g., magnetic regions and/or magnets) of rotor assembly 100. Note that the flux conductor shield 110 need not be limited to the example shown and can be of any varied structure having any shape and/or varied functionality that can function to at least support magnetic structure 105 and magnetically permeable structures 102 in compression during rotation. Magnetically permeable structures regions 102 can be formed from magnetic material (e.g., permanent magnets) or magnetically permeable material, or a combination thereof, but is not limited to those structures. In some embodiments, magnetically permeable structures 102 of FIG. 1 can be representative of surface magnets used to form the poles (e.g., the magnet poles) of rotor assembly 100, whereby one or more surface magnets can be formed, for example, using magnetic material and/or one or more magnets (e.g., permanent magnets), or other equivalent materials. In some embodiments, the term "magnetic material" can be used to refer to a structure and/or a composition that produces a magnetic field (e.g., a magnet, such as a permanent magnet). In various embodiments, magnetic regions 100 of FIG. 1 can be representative of one or more internal permanent magnets ("IPMs") (or portions thereof) that are used to form the poles 102 of rotor assembly 100, whereby one or more internal permanent magnets can be formed, for example, using magnetic material (e.g., using one or more magnets, such as permanent magnets) and magnetically permeable material, or other equivalent materials. According to at least some embodiments, the term "internal permanent magnet"

("IPM") can refer to a structure (or any surface or surface portion thereof) that produces a magnetic field, an IPM (or portion thereof) including a magnetic material and a magnetically permeable material through which flux passes (e.g., at least a portion of the flux being produced by the magnetic material).

Figure 5:
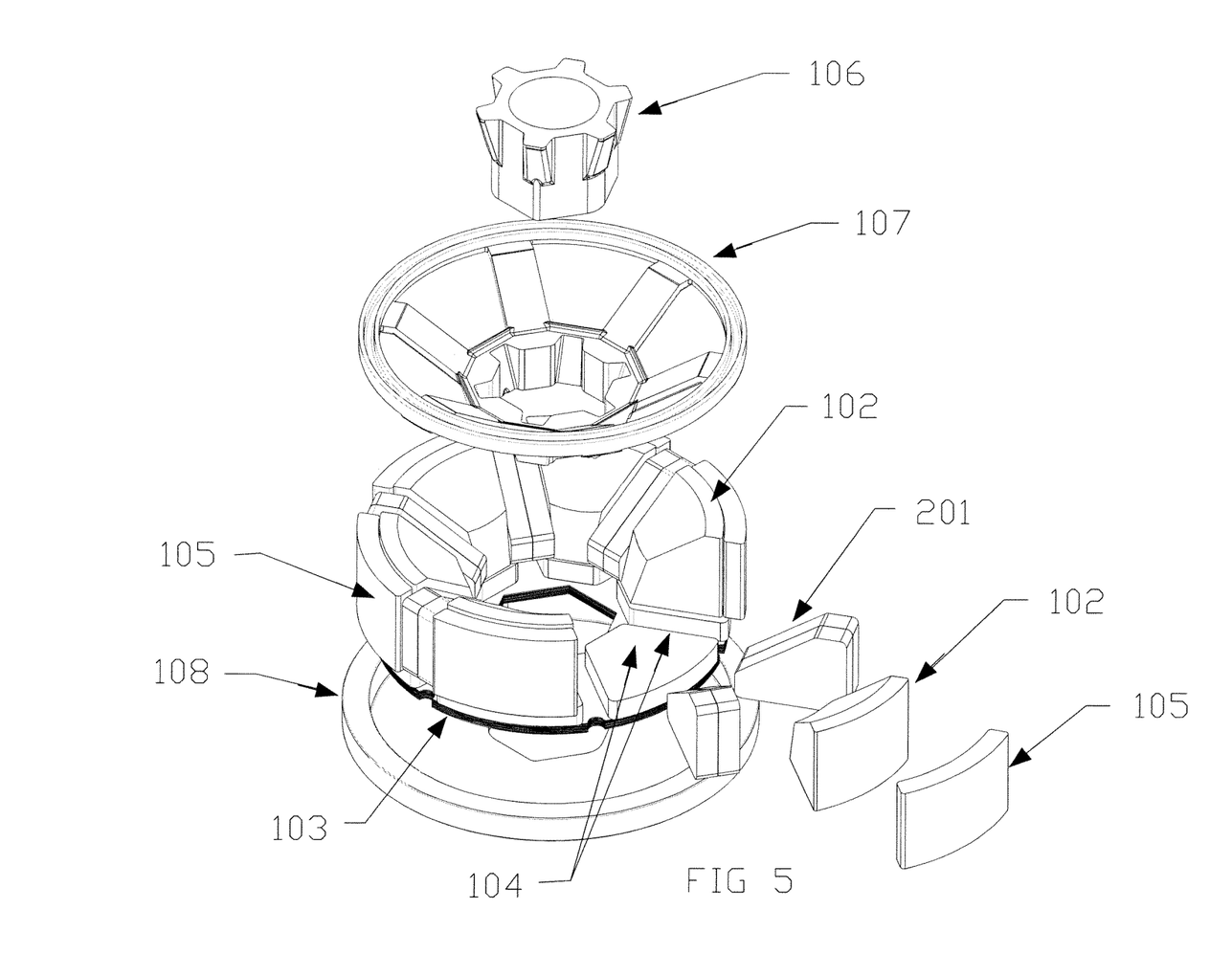
FIG. 5 is an exploded view of a rotor structure configured in accordance with an embodiment of the invention.

Referring to FIG. 5, an example of an IPM configuration is shown wherein magnetic material 201 is interleaved peripherally between adjacent poles 102 (magnetically permeable structures). The magnetic material 201 may be considered a first group of magnetic structures interleaved with the magnetically permeable structures 102. The figure also illustrates a second group of magnetic structures 105. The flux conductor shield 110 is adjacent to the second group of magnetic structures and is configured to provide a return flux path for the second group of magnetic structures.

The magnetic flux from magnetic materials 104, 105 and 201 are additively combined in each pole 102 to form an IPM configuration. In various embodiments, magnetic material of a magnetically permeable region 102 can be covered by another magnetically permeable material, such that the covering magnetically permeable material is disposed between the surfaces (or portions thereof) of magnetically permeable structure 102 and respective air gaps and/or pole faces. In at least some cases, the term "internal permanent magnet" ("IPM") can be used interchangeably with the term "interior permanent magnet."

Note that in some embodiments, boost magnets can be implemented to enhance the amount of flux passing between a magnetic region and a pole face, whereby the enhancement to the amount of flux by one or more boost magnets can influence the angle and/or surface areas of the magnetically permeable structure. Boost magnets can include magnetic material disposed on non-confronting surfaces of the magnetic permeable material 102 that are oriented off of a principal flux path. Boost magnets can include axial and radial boost magnets, such as axial magnet 104 and radial magnet 105. The type of magnet material constituting the boost magnets, the surface area of the boost magnets, and the surface area of magnetically permeable material adjacent to the boost magnets can influence or modify the amount of flux passing through a magnetically permeable structure.

In various instances, one or more of the surfaces of either the magnetic material or the magnetically permeable structure can be curved or straight (or can be formed from multiple straight portions to approximate a curved surface) at an inner radius dimension.

In some embodiments, magnetic structures 105 can be referred to as radial boost magnets, whereas magnetic structure 104 can be referred to as an axial boost magnet. A radial boost magnet can produce flux parallel to or along a radial direction relative to an axis, according to some embodiments. For example, a radial boost magnet can produce flux perpendicular to (or substantial perpendicular to) an axis of rotation. An axial boost magnet can produce flux parallel to or along an axial direction, according to some embodiments. For example, an axial boost magnet can produce flux parallel to (or substantial parallel to) an axis of rotation. Note that depicted magnetic structures and magnetically permeable structures are not limited to those shapes shown and are not limited to flat surfaces. Note that boost magnets can be made from the same magnet material or different magnet material than is disposed between magnetically permeable materials in the rotor assemblies. Further, boost magnets can have the same or different surface area dimensions as the adjacent surfaces of magnetic permeable material.

FIG. 5 also illustrates hub 106 and inner ring 107. Further, the figure shows flux conductor shield 103 and back plate 108.

Returning to FIG. 1, the rotor assembly 100 includes examples of flux conductor shields 103 and 110. Rotor assembly 100 also includes magnetic material 104 and 105 (or structures thereof, such as magnets) and magnetically permeable materials 102, 103, and 110. Rotor assembly 100 also can include outer radial boost magnets 105 and axial boost magnets 104. FIG. 1 also depicts flux conductor shields 103 and 110 configured to provide a return flux path (or a portion thereof) for one or more magnets, the return flux path portion residing in or traversing through a flux conductor shield. In some embodiments, a return flux path portion lies externally to a flux path or flux path portion that passes through magnetic material, such as magnetic material 104, 105 and 201, disposed between magnetically permeable materials 102. A flux conductor shield reduces or eliminates flux (e.g., stray flux) associated with magnets, such as boost magnets, that otherwise might extend externally from rotor assembly 100 or its components. Therefore, the flux conductor shield can minimize or capture flux that otherwise might pass through external materials that might cause losses, such as eddy current losses or hysteresis losses. As such, a flux conductor shield can minimize or negate magnetic-related losses due to structures located external to outer rotor assembly 100. In some examples, a flux conductor shield can operate to enhance flux by providing optimal magnetic return paths for boost magnets than otherwise might be the case. For example, a flux conductor shield can provide a magnetic return path that has a lower reluctance than otherwise might be the case (e.g., through air, a motor case, or any other external entity). A reduction in reluctance improves the amount of available flux (e.g., as generated by the boost magnets). Element 111 is a wrap of constraining material to support shield structure 110 against the forces generated by the rotation of the rotor assembly about the axis of rotation.

Figure 6A:
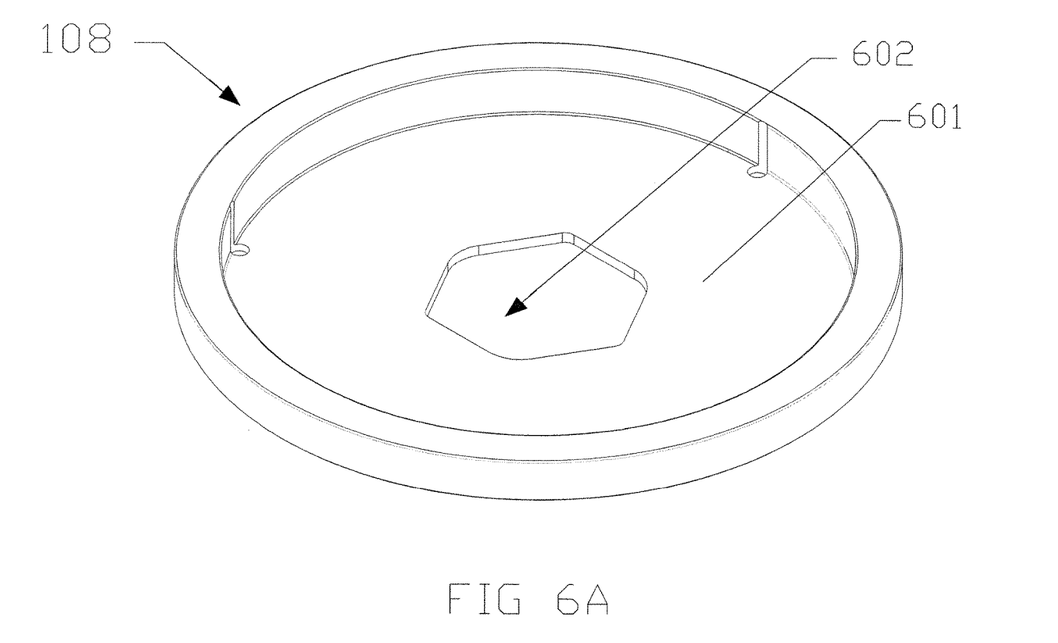
FIGS. 6A-6B illustrate a magnetically permeable plate utilized in accordance with an embodiment of the invention.
Figure 6B:
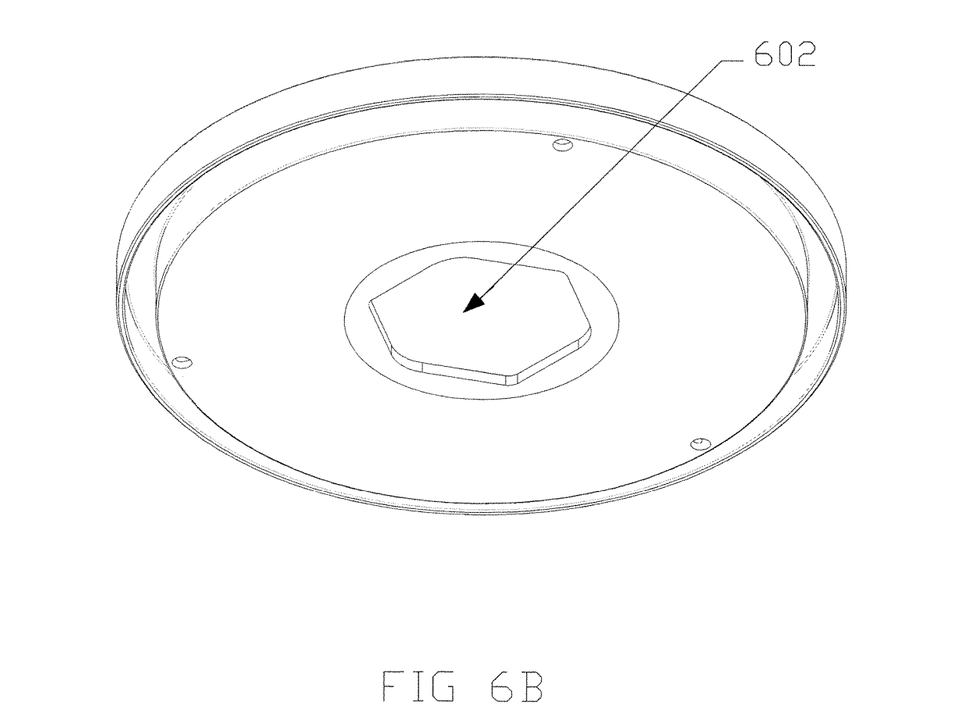

FIG. 6A is a depiction of the back plate 108. The back plate defines a feature 602 (e.g., a hole) that is configured to accept one end of the hub, 106. Upon assembly, that end of the hub 106 may be affixed to the back plate by any number of affixing processes including fusion weld.

Figure 7:
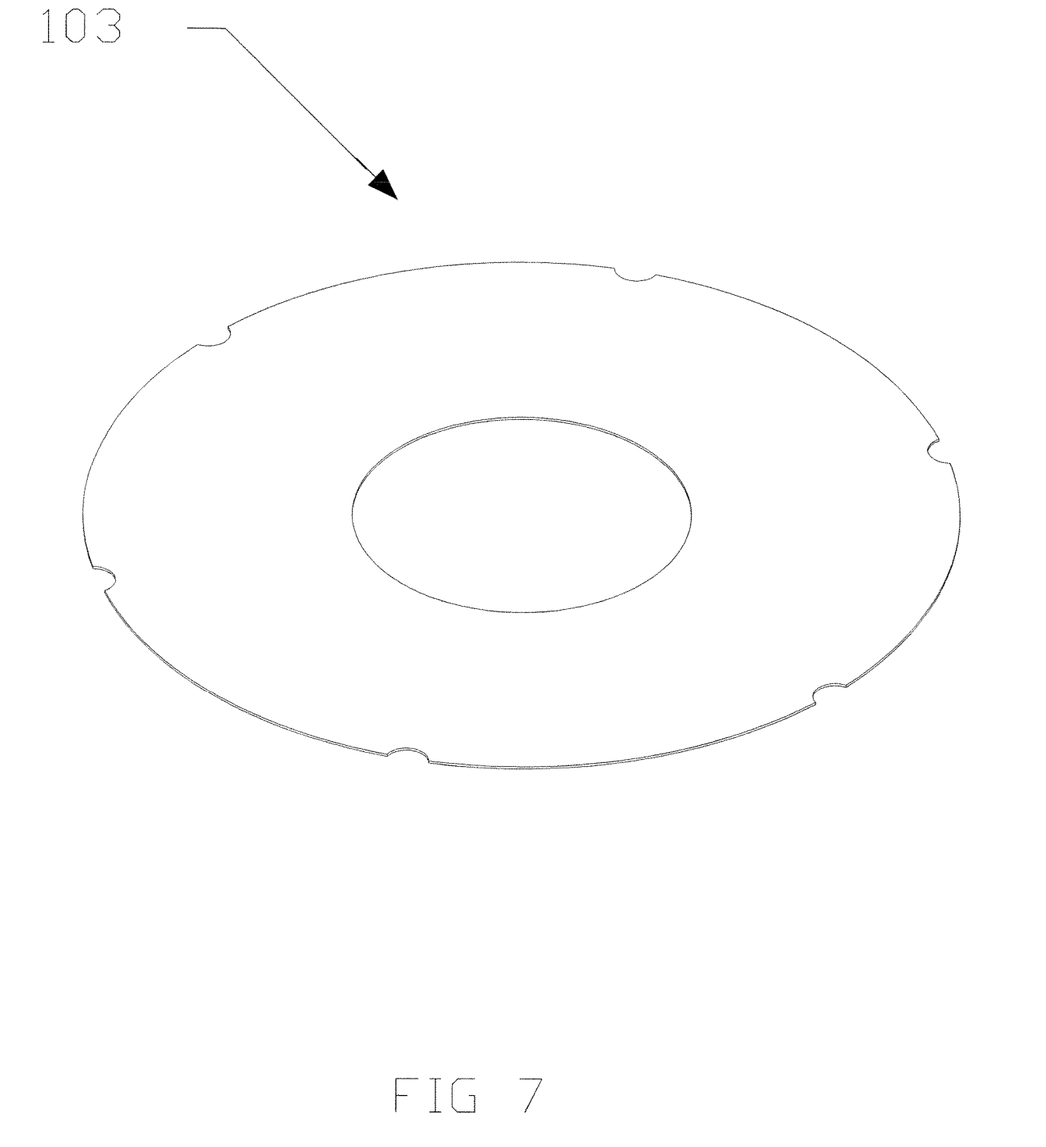
FIG. 7 illustrates a flux conductor shield utilized in accordance with an embodiment of the invention.

FIG. 7 is a depiction of a flux conductor shield 103 configured as an axial disc. Specifically depicted is one of several magnetically permeable laminations which may be stacked to create the flux conductor shield 103 of FIGS. 1 and 5.

Thus, a high efficiency conical air gap electrodynamic machine is disclosed. The machine produces integral horsepower ranges, in one embodiment, using ceramic permanent magnets. Ceramic permanent magnets are typically brittle and may exhibit defects caused by applied forces. The disclosed machine distributes forces through mechanical supports and other means to improve motor component stability.

A detailed description of one or more examples has been provided above along with accompanying figures. The detailed description is provided in connection with such examples, but is not limited to any particular example. The scope is limited only by the claims, and numerous alternatives, modifications, and equivalents are encompassed. Numerous specific details are set forth in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A rotor structure for a conical air gap electrodynamic machine, comprising:
   one or more rotor assemblies arranged on an axis of rotation, each of the one or more rotor assemblies including:
   magnetically permeable structures positioned radially about the axis of rotation, the magnetically permeable structures including:
      first surfaces confronting the conical air gap that are non-parallel to the axis of rotation,
      second adjacent surfaces, adjacent to the first surfaces, that are non-parallel to the axis of rotation,
      the second adjacent surfaces are disposed radially closer to the axis of rotation than the first surfaces, and
      non-confronting surfaces;
   one or more groups of magnetic structures including magnetic material, the one or more groups of magnetic structures including:
      a first group of magnetic structures interleaved with the magnetically permeable structures,
      a second group of magnetic structures, and
      a flux conductor shield disposed adjacent to the second group of magnetic structures, the flux conductor shield configured to provide return flux paths for the second group of the magnetic structures;
   a hub structure positioned axially on the axis of rotation which has mating surfaces which are adjacent to and coextensive with the second adjacent surfaces of the magnetically permeable structures;
   a magnetically permeable plate disposed in a plane that is perpendicular to the axis of rotation, at least a portion of which is configured as a disk; and
   an inner ring positioned between the hub structure and the magnetically permeable structures, the inner ring having surfaces disposed adjacent to and coextensive with the second adjacent surfaces of the magnetically permeable structures.

2. The rotor structure of claim 1 wherein the second group of magnetic structures is disposed external to the magnetically permeable structures.

3. The rotor structure of claim 1 wherein the second group of magnetic structures further includes:
   axial boost magnets, and
   wherein the flux conductor shield is an axial flux conductor shield.

4. The rotor structure of claim 1 wherein the second group of magnetic structures further includes:
   radial boost magnets, and
   wherein the flux conductor shield is a radial flux conductor shield.

5. The rotor structure of claim 3 wherein the magnetically permeable plate is positioned external to the axial boost magnets in the axial direction to aid flux paths of the axial flux conductor shield, the axial boost magnets being affixed to the magnetically permeable plate in a predetermined position,
   the magnetically permeable plate being mechanically positioned circumferentially relative to the hub structure, and
   the magnetically permeable plate being affixed to the hub structure.

6. The rotor structure of claim 1 wherein the first surfaces of the magnetically permeable structures are concave to conform to the shape of the conical air gap.

7. The rotor structure of claim 1 wherein the second adjacent surfaces of the magnetically permeable structures are planar, and the mating surfaces of the hub are planar.

8. The rotor structure of claim 1 wherein the second adjacent surfaces of the magnetically permeable structures are curved, and the mating surfaces of the hub are curved.

9. The rotor structure of claim 1 wherein the mating surfaces of the hub structure provide a wedge-like action on the adjacent second surfaces of the magnetically permeable structures when the hub structure is displaced in the axial direction, the wedge action serving to lock the magnetically permeable structures into axial positions along the axis of rotation.

10. The rotor structure of claim 1 wherein the hub structure has a feature substantially in the axial direction, and is aligned with the axis of rotation to accept a rotatable shaft to which the hub structure is affixed.

11. The rotor structure of claim 1 wherein the hub structure defines channels disposed in the radial direction and extending from the inside surface of the hub to the outside surface of the hub, the channels being aligned substantially perpendicular to the axis of rotation.

12. The rotor structure of claim 11 wherein thermoset or thermoplastic are introduced into void regions of the rotor structure to provide strength and stability.

13. The rotor structure of claim 1 further comprising one or more non-magnetic structures disposed adjacent to the one or more groups of magnetic structures.

14. The rotor structure of claim 1 wherein a thermoset or thermoplastic material is in void regions of the rotor structure to provide strength.

15. The rotor structure of claim 1 wherein the inner ring is disposed adjacent to the magnetic structures to substantially seal the magnetic structures from exposure to the conical air gap.

* * * * *